United States Patent
Radstake (10) Patent No.: US 6,572,168 B1
(45) Date of Patent: Jun. 3, 2003

(54) COMBINATION SLIDABLE, PIVOTAL AND LOCKABLE DRAWER ENGAGEABLE WITH A CEILING SURFACE

(76) Inventor: Thomas Radstake, 7073 Rolling Hills Dr., Waterford, MI (US) 48327

(*) Notice: Subject to any disclaimer, the term of this patent is extended or adjusted under 35 U.S.C. 154(b) by 0 days.

(21) Appl. No.: 10/035,652

(22) Filed: Nov. 9, 2001

(51) Int. Cl.[7] .............................................. B62D 33/04
(52) U.S. Cl. ..................... 296/24.1; 296/37.6; 312/245; 312/246; 224/311; 224/315
(58) Field of Search ................... 296/24.1, 37.1, 296/37.6, 37.7, 37.8; 312/245, 246; 224/309, 311, 315, 324, 328, 329

(56) References Cited

U.S. PATENT DOCUMENTS

| | | | |
|---|---|---|---|
| 4,424,907 A | 1/1984 | Robb | 211/60 R |
| 4,469,364 A | 9/1984 | Rafi-Zadeh | 296/37.6 |
| 4,733,898 A | 3/1988 | Williams | 296/24 R |
| 4,789,195 A | 12/1988 | Fletcher | 296/37.6 |
| 5,050,922 A * | 9/1991 | Falcoff | 296/37.7 |
| 5,056,857 A | 10/1991 | Ney et al. | 296/107 |
| 5,407,261 A | 4/1995 | Mercer | 312/248 |
| 5,466,028 A * | 11/1995 | Nicopolis | 296/37.7 |
| 5,593,201 A | 1/1997 | Bateman | 296/100 |
| 5,667,268 A * | 9/1997 | Bump | 296/37.6 |
| 5,685,593 A | 11/1997 | O'Connor | 296/39.2 |
| 5,775,761 A * | 7/1998 | Asami et al. | 296/37.7 |
| 5,829,813 A | 11/1998 | LaValle | 296/376 |
| 5,845,957 A | 12/1998 | Hurst | 296/100 |
| 5,895,086 A | 4/1999 | Carico | 296/37.6 |
| 5,897,154 A * | 4/1999 | Albertini et al. | 296/37.6 |
| 5,988,473 A | 11/1999 | Hagan et al. | 224/404 |
| 5,992,718 A * | 11/1999 | Zaranek | 224/311 |
| 6,126,221 A * | 10/2000 | Kern | 296/37.7 |
| 6,199,930 B1 * | 3/2001 | Riley | 296/37.6 |
| 6,244,651 B1 | 6/2001 | Hecock, Jr. | 296/100.12 |
| 6,331,026 B1 * | 12/2001 | Adsit et al. | 296/37.7 |

* cited by examiner

*Primary Examiner*—D. Glenn Dayoan
*Assistant Examiner*—Lori L Coletta
(74) *Attorney, Agent, or Firm*—Gifford, Krass, Groh, Sprinkle, Anderson & Citkowski, P.C.

(57) ABSTRACT

A drawer assembly securable against a ceiling surface to conceal a recessed interior. A drawer is dimensioned to be received within the recessed interior of a cover housing secured to the ceiling. The base and sides of the drawer define a cavity arrayed in opposing fashion to the recessed interior of the cover housing. Cylinders secure the drawer to the housing in combination with a pair of slide mechanisms in pivoting fashion along one end thereof. A counterbalance provides smooth and effortless balancing of the combined weight of the drawer and its interiorly held contents. A release mechanism actuates the cylinders, counterbalance axle and slide mechanisms in successive fashion to actuate the drawer to its fully extended position in which the object supportable and open cavity is fully exposed.

18 Claims, 5 Drawing Sheets

COMBINATION SLIDABLE, PIVOTAL AND LOCKABLE DRAWER ENGAGEABLE WITH A CEILING SURFACE

BACKGROUND OF THE INVENTION

1. Field of the Invention

The present invention relates generally to retractable storage compartment devices. More specifically, the present invention discloses a combination slidable, pivotal and lockable storage drawer, typically engaged with a ceiling surface of a motor vehicle, such as a truck cap, tonneau cover, or interior of a passenger vehicle or van; alternatively, the drawer is engageable against a ceiling of an interior structure, such as a room or closet. Additionally, the present invention discloses such a device providing for smooth, deliberate, simultaneous and safe downward pivoting/translation of the drawer, through the provision of interconnecting gas spring cylinders and slide mechanisms, and in order to present valuables, such as for example firearms, hunting bows or the like.

2. Description of the Prior Art

The prior art is fairly well documented with examples of retractable storage racks, containers, compartments and the like. The objective in each instance is to provide a convenient assembly for holding, storing and, when desired, revealing objects for access by a user.

A first example of the prior art is set forth in U.S. Pat. No. 5,829,813, issued to LaValle, and teaches a plurality of storage units for use with a truck topper, the topper including front and rear ends, a roof and sidewalls. Each of the retractable storage units provides a storage space for articles to be held/stored. A hinge is attached to the roof of the topper and allows the storage portion of each unit to be opened downwardly. A support attaches each storage unit to the roof, at an end opposite the hinge, and such support may further include a rope, cable, strut or other equivalent. In the preferred variant, LaValle discloses each retractable storage unit as further including a keyed lock means, including a "hasp" for locking the unit in a retracted position against the truck topper ceiling, rendering the contents inaccessible.

U.S. Pat. No. 4,424,907, issued to Robb, teaches a fold-down storage rack for permitting the storage of fishing rods across a ceiling. The storage rack includes first and second rack supports, a pair of parallel rods pivoted to one rack support and including a ridging end member between the rods. The second rack support extends parallel to the first rack support and includes a holding bracket coupled thereto and which movably engages with an end member for holding the rack in a storage position substantially parallel with the ceiling. A pivot located along one side and locking tabs providing along an opposite side provide the ability of the rack to be disengaged and pivoted away from the ceiling.

Finally, U.S. Pat. No. 5,407,261, issued to Mercer, teaches a retractable storage container for attachment to the enclosed ceiling of a room. The container includes upper and lower hingedly connected portions. An over-center linkage, including a tension spring, connects the upper and lower portions and a pivot pin, forming a part of an associated linkage, acts as a physical stop to hold the lower portion down when pivotally actuated. Mercer is further disclosed as being capable of receiving, in inserting fashion upon the pivoted lower portion, such items as garden tools and golf bags which can then be raised to the upper portion, and where once again the spring will hold the two portions together.

SUMMARY OF THE PRESENT INVENTION

The present invention discloses a combination slidable, pivotal and lockable storage drawer, typically engaged with a ceiling surface of a vehicle or standing structure. More particularly, the present invention discloses such a device providing for smooth, deliberate, effortless, and safe downward pivoting and slidable translation of a drawer from a sealing and abutting position against the overhead ceiling, such action being provided through the provision of interconnecting gas spring cylinders and slide mechanisms, and in order to present valuables, such as for example firearms, hunting bows or the like. The provision of a counterbalance axle, in biasing engagement with an associated pivot axle of the drawer slide, assists in providing substantially weightless operation during opening and closing of the drawer.

A fixed cover housing includes a substantially rectangular shape defining, in combination, a recessed interior. The cover housing secures against the ceiling surface, such as through the provision of bolt, spacer and nut fasteners to and in order to array the recessed interior in a downwardly facing manner, such as towards either a room enclosure or an inner side of a truck cap, truck tonneau cover, or other suitable vehicle application.

A substantially rectangular shaped drawer has a base and a plurality of extending and interconnecting sides which are dimensioned so as to be matingly received within the recessed interior of the fixed cover housing. The base and sides of the drawer further define, in combination, an object supportable and open cavity arrayed in opposing fashion to the recessed interior of the cover housing. The open cavity is typically dimensioned for receiving valuables and/or weaponry such as firearms, hunting bows and the like. It is further envisioned that thickened foam inserts, such as may also include negatively formed impressions matching outlines of such held objects, may be installed within either or both the open cavity of the drawer and recessed interior of the fixed cover housing. The furthering purpose of the foamable or padding inserts is to fixedly isolate the held contents during both opening and closing of the drawer and, in vehicle applications, during motion of the vehicle.

A pair of gas spring cylinders are provided, outer portions of which pivotally secure, at first respective ends, to first and second, preferably interior, locations of the fixed cover housing. Inner telescoping portions of the cylinders pivotally secure, at second respective ends, to first and second, likewise preferably interior, locations of the drawer.

A pair of slide mechanisms are provided, each of which including an elongated and inner channeling member secured along a respective and parallel extending side of the drawer. The inner channeling members are maintained in translatable and tracking fashion within corresponding elongated and outer channeling members, each of the outer channeling members in turn terminating in a mounting portion projecting beyond the drawer. The mounting portions each include an exterior and arcuately configured cam follower surface terminating in an end stop.

A pivot axle extends between opposite facing sides of the cover housing and engages the mounting portions to rotatively secure the drawer to the pivot axle. A counterbalance axle extends between opposite facing sides of the cover housing in spaced and parallel relation to the pivot axis. A pair of arms project from locations of the counterbalance axle, and each of the arms terminate in an angle end tab engaged in guiding fashion along an associated cam follow surface. Typically, the counterbalance axle further includes first and second anchor mounts securing to opposite facing sides of the cover housing and so that the projecting arms with end tabs extending in fixed fashion.

A release mechanism, typically a push button or a rotatable key lock, extends between the matingly received drawer and the cover housing, at a location independent from the pivot axle and such as along a side opposite that associated with the pivot axle. The release mechanism is engaged to actuate the cylinders to downwardly pivot the drawer. The cylinders typically permit the drawer to initially pivot a selected acute angle relative to a horizontal axis passing through the fixed cover housing (such as ideally a 30° rotational increment), following which the effect of the engaging counterbalance axle, in addition to the combined weight of the drawer and interiorly supported contents, causes the slide mechanisms to translatably actuate the drawer to a fully extended position (again in controlled fashion given inwardly telescoping action of the gas spring cylinders).

The object supportable and open cavity is thus fully exposed, with the gas spring cylinders further providing a specified degree of opposing and holding force to the drawer in both the fully extended and fully retracted positions. The nature of the gas spring cylinders is such that, during both extending and retracting motion, it further assists in maintaining substantially balanced forces on the drawer and so that a minimum of effort is required by the user.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 8:
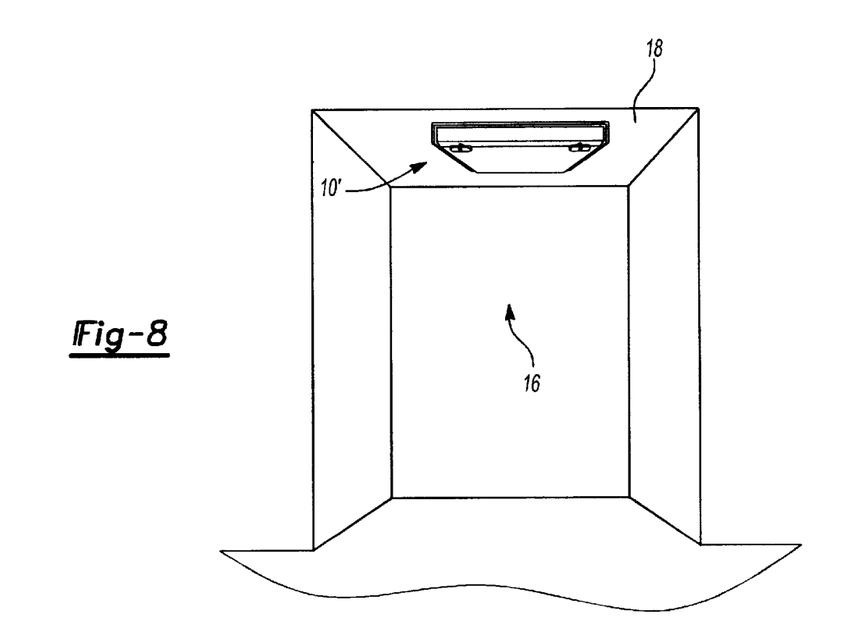
FIG. 8 illustrates the combination slidable and pivotal drawer engageably and actually mounted at a structural interior location, such as against a ceiling of a closet, according to a further preferred application.

Referring now to FIGS. 1–5, a combination slidable, pivotal and lockable drawer is illustrated at 10 according for use with a ceiling surface 12 according to a first preferred variant of the present invention. As previously explained, the present invention provides for smooth, deliberate, effortless, and safe downward pivoting and slidable translation of the drawer from a sealing and abutting position against the overhead ceiling 12, such as in this instance being an inner top surface of a cap 13 (see again FIG. 1) covering a bed of a conventional pickup truck 14. It is however again contemplated that the drawer assembly 10 of the present invention can also be incorporated in use with suitable ceiling surfaces associated with such as substantially rigid truck tonneau covers, vans and larger passenger vehicles having suitably dimensioned interior ceiling surfaces, as well as fixed structural locations, such as ceilings located in room closets or the like (reference further being had to drawer assembly 10' in interior room enclosure 16 with ceiling surface 18 in the alternate application of FIG. 8). As will also be further explained in additional detail, the construction of the drawer assembly, including in particular the arrangement and configuration of its actuating cylinder, provide for measured and controlled motion of the drawer during both extension and retraction and to provide both increased safety as well as a minimum of required exertion by the user.

Figure 1:
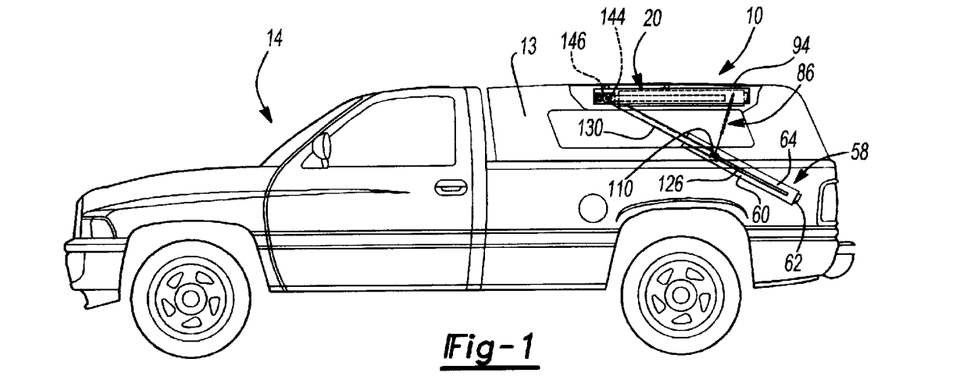
FIG. 1 is an operational view, in side cutaway, and illustrating the combination slidable and pivotal drawer secured to a ceiling surface of a pickup truck cap and in fully extended fashion according to a first preferred embodiment of the present invention.
Figure 2:
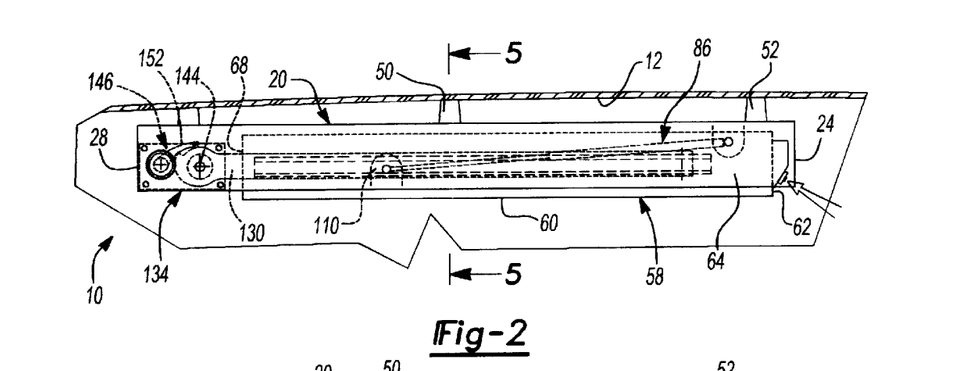
FIG. 2 is an enlarged sectional view, again in side cutaway, of the slidable and pivotal drawer illustrated in FIG. 1 and illustrated in a fully retracted position.
Figure 3:
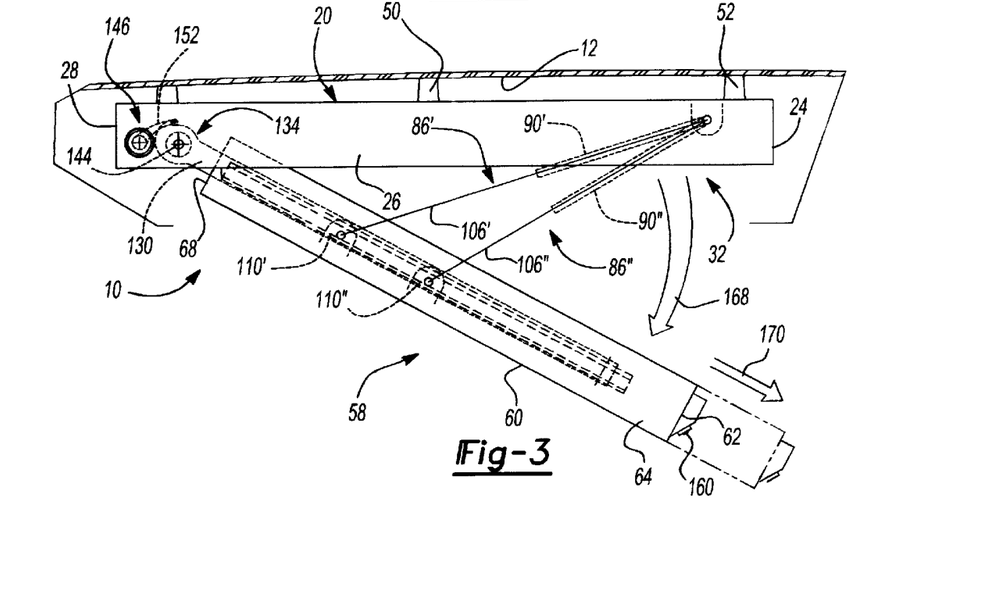
FIG. 3 is a view similar to that shown in FIG. 2 and illustrating the sequential and combined downwardly pivotal and slidable action of the drawer relative to the gas spring cylinders and slide mechanisms forming portions of the present invention.
Figure 4:
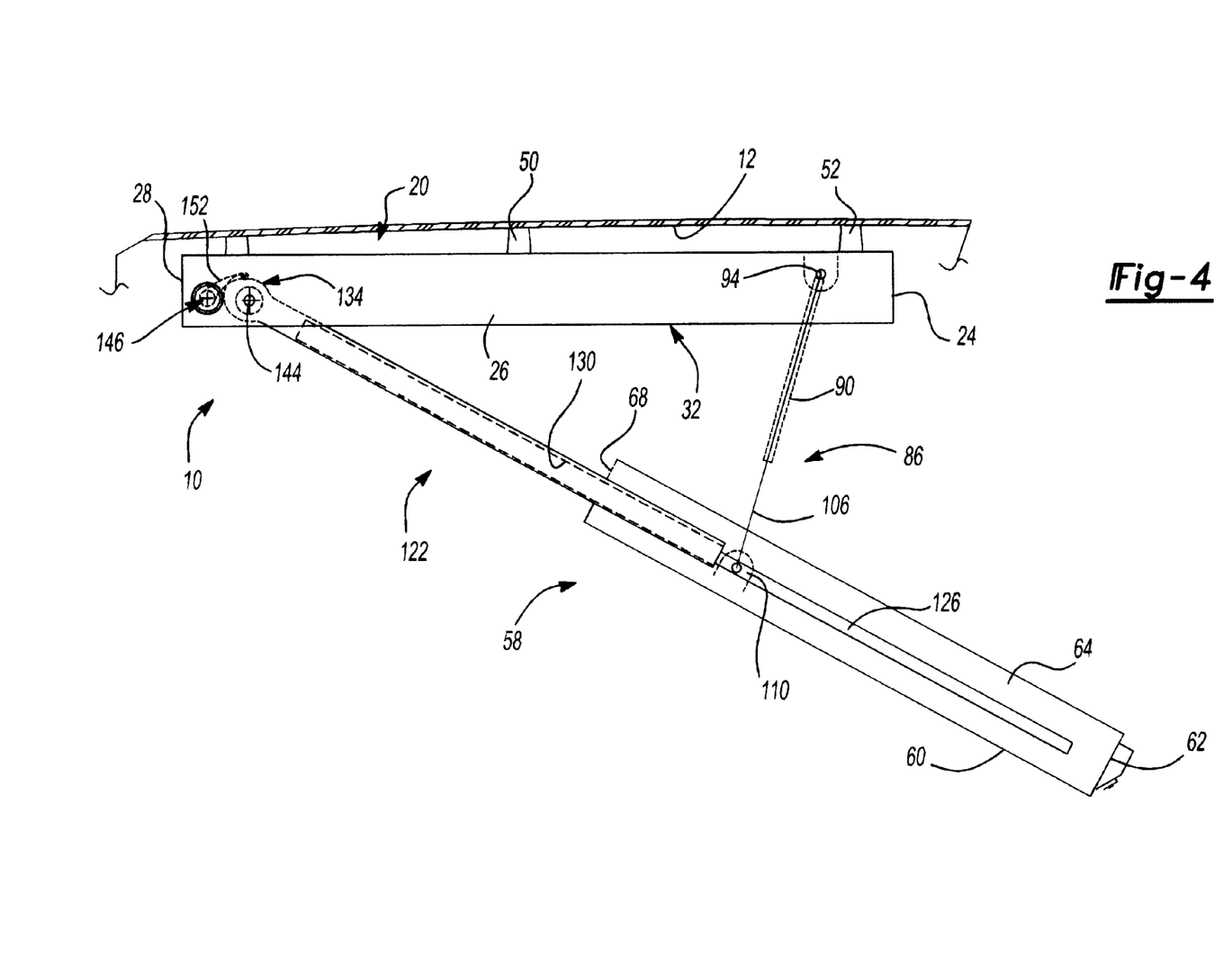
FIG. 4 is a further enlarged side view of the present invention, similar to that previously represented in FIG. 1, and again showing the drawer in a substantially fully extended position.
Figure 7:
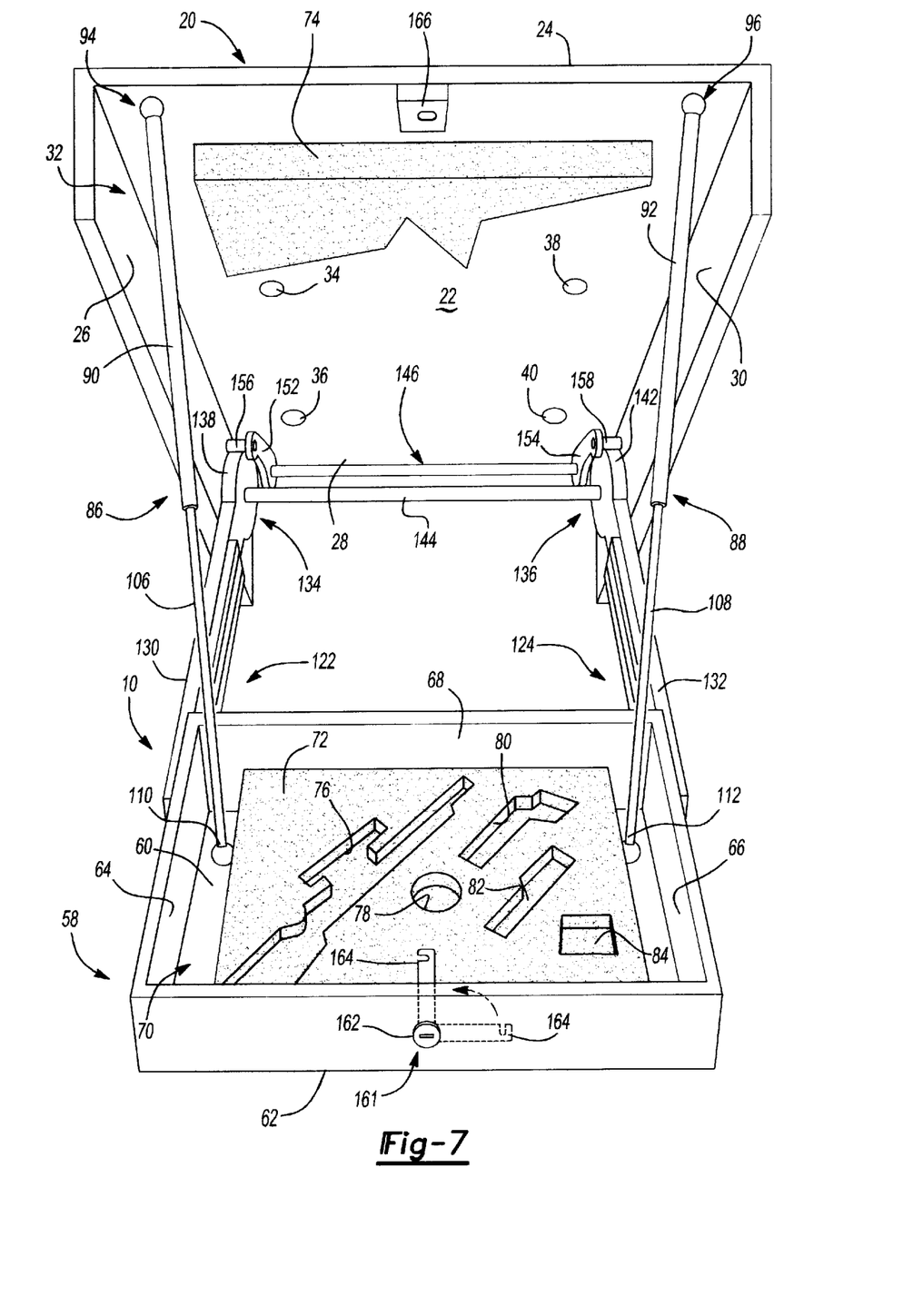
FIG. 7 illustrates a forward facing perspective of the drawer in substantially downwardly pivotal and slidably actuated fashion and further illustrating the thickened foam insert including outline recesses for holding such items as a hunting rifle and cordless screw gun, as well as the provision of a key locking and latch mechanism for locking the drawer in a fully retracted position according to the present invention.

Referring again to the drawing figures, the drawer assembly 10 includes, in a preferred embodiment, the provision of a fixed cover housing 20, the housing typically including a generally polygonal, in the preferred embodiment rectangular, shape and with a base surface 22 surrounded by a plurality of four 24, 26, 28 and 30 interconnected and extending sides, the base 22 and sides 24, 26, 28 and 30 defining, in combination, a recessed interior 32 (see as best shown in FIGS. 3, 4 and 7). The cover housing 20 further is preferably constructed of a durable metal, impact resistant polymer, plastic or any other suitable material which exhibits the necessary physical properties and may also include apertures 34, 36, 38 and 40 (see FIG. 7) suitable for receiving mounting bolts (see at 42 and 44 in cutaway of FIG. 5). Additional mounting components such as washers 46 and 48, interiorly hollowed spacers (pairs at 50 and 52) and corresponding tightening nuts 54 and 56 (see again FIG. 5) may be provided for mounting the fixed cover housing 12 in either adhering or desired spaced apart fashion relative to the ceiling surface 12.

A generally polygonal, again preferably rectangular, shaped drawer is generally referenced at 58 and includes a base 60 and a plurality of four 62, 64, 66 and 68 extending and interconnected sides which are dimensioned so as to be matingly received within the recessed interior 32 defined in the affixed cover housing 20 and upon the drawer 58 being fully retracted within the cover housing 20. The base 60 and sides 62–68 of the drawer 58 define, in combination, an object supportable and open cavity (see at 70 as best shown in FIG. 7) and which is arrayed in opposing fashion to the recessed interior 32 of the fixed cover housing 20.

As described previously, the drawer assembly of the present invention is capable of holding most any type of valuable or object, however a preferred application is its usefulness in providing both secure holding and retrieval of such objects as firearms, hunting bows and the like. Along these lines, thickened foam inserts (see at 72 and 74) may be installed within the drawer cavity 70 and recessed housing interior 32, respectively. It is contemplated, in a preferred variant, that such foam (or other suitable cushioning material) may be provided at thicknesses ranging from 2" or more. Additionally, it is contemplated that negatively shaped impressions (see at 76, 78, 80, 82, and 84 in FIG. 7) may be formed into the foam inserts (see insert 72). The purpose of the negative impressions is to assist in holding and restraining during vehicle motion such objects (not shown) as a rifle (with scope), cordless screwgun, and the like.

A pair of gas spring cylinders, illustrated generally at 86 and 88, are provided and interconnect the drawer 58 to the fixed cover housing 20. While disclosed in the preferred variant as gas spring type cylinders, it is understood that the cylinder elements discussed herein may include both gas biased, as well as mechanical spring biased cylinders. It is also understood that other and additional biasing elements, beyond those specifically disclosed herein, may be employed and in order to provide the required degree of controlled biasing force.

Figure 5:
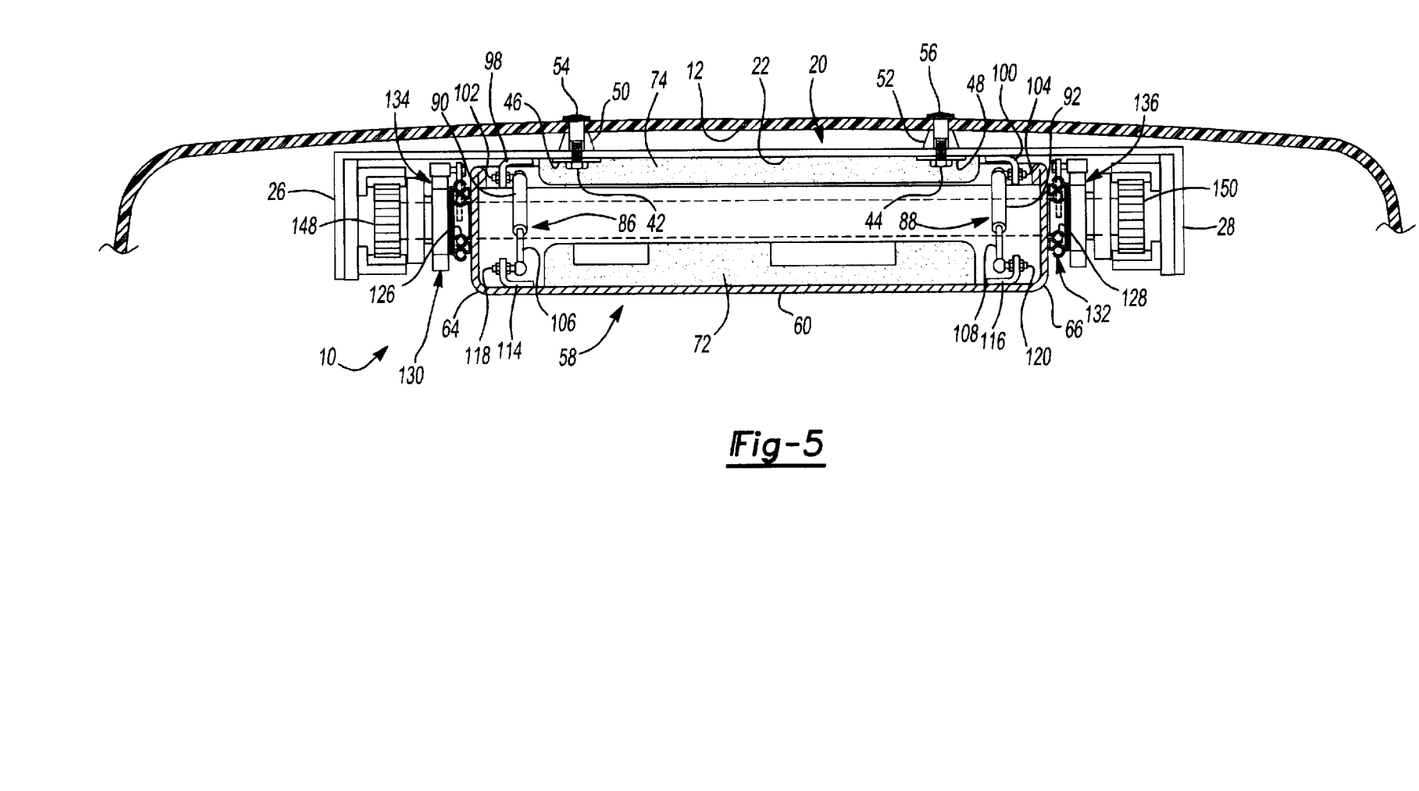
FIG. 5 is a cutaway taken along line 5—5 of FIG. 2 and showing, from a rearward plan view, the arrangement of components including the exteriorly mating, fixed and downwardly extending cover housing, the inwardly mating and pivotal/slidable drawer, the gas spring cylinders and connected slide mechanisms, and the counterbalance axle according to the present invention.

Referring again to the drawing illustrations, and most notably to FIGS. 5 and 7, the gas spring cylinders 86 and 88 each further include an outer portion (see at 90 for gas spring 86 and at 92 for gas spring 88) secured to recessed interior locations (see at 94 and 96 of FIG. 7) of the fixed cover housing 20. As best illustrated in the cutaway view of FIG. 5, the securing locations 94 and 96 are more specifically described in the preferred embodiment as including "L" shaped brackets 98 and 100 with channeled pivot pins 102 and 104 extending therethrough and which secure the ends of the cylinder outer portions 90 and 92 in pivotal fashion.

The gas spring cylinders 86 and 88 also include inner portions 106 and 108, respectively, and which are telescoping in biasing fashion in both inwardly and outwardly translating fashion relative to the outer portions 90 and 92. The inner telescoping portions 106 and 108 secure to locations (110 and 112 in FIG. 7) within the base 60 of the object supportable cavity. Referring again to FIG. 5, the securing locations 110 and 112 are again specifically described in the preferred embodiment as including additional "L" shaped brackets 114 and 116 with channeled pivot pins 118 and 120 extending therethrough and which secure the ends of the cylinder inner portions 106 and 108 in likewise pivotal fashion. It is also contemplated that, although the cylinders 86 and 88 are illustrated in substantially interior and hidden (when fully retracted) fashion, it is also understood that the location, configuration and placement of the cylinders may be modified without departing from the scope of the invention.

A pair of slide mechanisms, referenced generally at 122 and 124 as again best illustrated in FIG. 7, are provided. Each of the slide mechanisms 122 and 124 includes an elongated and inner channeling member, see respectively at 126 for first slide mechanism 122 and at 128 for second slide mechanism 124. The inner channeling members 126 and 128 are substantially hidden from the outward perspective view of FIG. 7, however are more clearly illustrated from the cutaway view of FIG. 5, the phantom views of FIGS. 2–4, and partial view of FIG. 6. As also best illustrated, the inner channeling members secure in exteriorly facing fashion substantially along the lengths of opposite facing sides 64 and 66 of the drawer 58 and, as is customarily known in the art, including a particular tracking configuration.

Outer channeling members 130 and 132 (for first 122 and second 124 slide mechanisms, respectively) are provided and within which the fixed and inner channeling members 126 and 128 are slidably and translatably mounted in the desired tracking fashion over a specified range. Referring in particular to the enlarged view of FIG. 6, the selected channeling member 130 including an inwardly facing tracking portion 131 fittable over the corresponding inner channeling member 126. Each of the outer channeling members 130 and 132 terminate in a mounting portion, see at 134 for outer channeling member 130 and at 136 for outer channeling member 132. The mounting portions 134 and 136 in all positions extend some point beyond the drawer 58, such as beyond the rear associated side 68 and, as best illustrated in the partial view of FIG. 6, a perspective of the mounting portion 134, illustrates an exterior and arcuately configured cam follower surface 138, over a predetermined outer circumferential distance, and terminating in an end stop 140. Although not clearly illustrated (see however also perspective of FIG. 7), the second mounting portion 136 likewise includes a likewise configured cam follower surface 142 and terminates (not illustrated) in a likewise configured end stop.

The extending mounting portions 134 and 136 are further connected by a pivot axle 144, such as which typically extending within the recessed interior 32 and between the opposite facing surfaces associated with the spaced apart sides 26 and 30 of the fixed cover housing 20. The pivot axle 144 thus rotatably engages the mounting portions 134 and 136 to pivotally secure the drawer 56 to the overall assembly.

A counterbalance axle 146 is provided and which extends again between the opposite facing surfaces of the spaced apart sides 26 and 30 of the fixed cover housing 20. The counterbalance axle 146 typically includes first 148 and second 150 anchor mounts (see both cutaway view of FIG. 5 and enlarged partial perspective view of FIG. 6) securing to the opposite facing sides 26 and 30 of the fixed housing 20. A pair of arms 152 and 154, respectively, extend in forwardly and generally arcuate fashion from specified locations of the counterbalance axle 146 (such locations being proximate to the arrangement of the mounting portions 134 and 136). Each of the extending arms 152 and 154 likewise terminate in an angled and extending end tab 156 and 158 which engage, respectively, in guiding fashion along the corresponding cam follower surfaces 138 and 142 defined upon the exterior surfaces of the mounting portions 134 and 136.

As will be described with further referencing to the functional sequences associated with the drawer assembly (in both expanding and retracting capacities), the counterbalance axle 146 in the preferred variant remains fixed and so that the angled end tabs 156 and 158 may slidably translate along the exterior configured cam follower surfaces 138 and 142 up to the point in which they abuttingly contact the end stops (see again at 140 for enlarged illustrations of first mounting portion 134 in FIG. 6). It is however also understood that additional and different variations of the counterbalance axle may contemplate some degree of rotation or pivoting, such as by utilizing other and modified versions of cam follower extending arms and internal torque rods, and so that a carefully controlled degree of rotationally induced spring energy may be released in precise counteracting fashion to the downward forces of gravity, the combined weight of the drawer and contents, and factoring in any reverse gas spring cylinder forces.

A release mechanism is provided for permitting the drawer 58, when matingly engaged within the recessed interior 32 of the fixed cover housing 20, to be released and to initiate its downwardly pivoting and, subsequently, forwardly translating motion. In one variant, the release mechanism includes a push button 160 (see in particular FIG. 3) located on an outwardly facing surface of a selected side of the drawer 58 (typically the forward such side 62) and which is opposite the side 68 associated with the pivot axle 144. Although not shown, it is understood that an associated latching mechanism is provided in relation to an associated location of the fixed cover housing 20, typically proximate its corresponding front side edge 24 and so that, upon depressing the push button 160, conventionally known structure in the art will permit the latch to disengage the drawer 58 from the housing 20.

Referring again to FIG. 7, it is also contemplated that the release mechanism may include, in an alternate variant, a locking portion including a keylock 161 with an insertable and rotatable portion (movable over at least a substantially ninety degree range corresponding to position identifications 162 and 164) and associated again with the selected side 62 of the drawer 58 opposite the corresponding side 68 associated with the pivot axle 144. The locking variant further includes a latch 166 located on the cover housing 20 (typically on a corresponding and inner or outer exposed surface of the front side 24) and which is selectively engaged by the rotatable portion 162 resulting from rotational activation of the keylock.

Additional variants of the release mechanism contemplate the provision of two keyed or finger touch recesses arranged on both side edges of the drawer forward face. Additional variants include the provision of flush mounted pop-up or T shaped handles for clamping the drawer to the fixed cover housing as well as any other suitable type of selective engaging/disengaging mechanism within the capability of one skilled in the art.

Having substantially described the structural aspects of the combination pivotal and slidable drawer assembly, an explanation will now be made as to the physical aspects associated with the controlled, and substantially effortless, extension and reverse mating retraction of the drawer. Specifically, and in the fully retracted position of the drawer 58 within the fixed cover housing 20 in FIG. 2, the release mechanism (according to any variant disclosed or suggested) may be engaged. At this point, the weight of the drawer 58 and its held contents causes the drawer to pivot a selected angular increment (in the preferred embodiment being in the range of 30 degrees from a horizontal axis formed through the fixed cover housing 20 and such as is further evidenced by the position of outer portion 90' and securing location 110' in FIG. 3 but also contemplated to be any suitable angle, although preferably an acute angle and moreover one typically less than a 90 degree angle).

Figure 6:
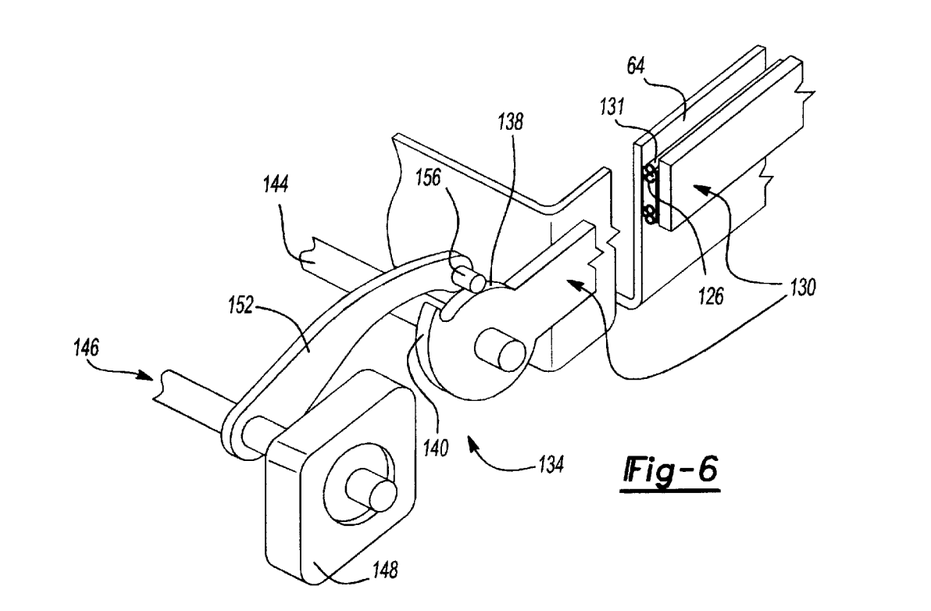
FIG. 6 is an enlarged partial view, in perspective, of a structural connection established between the counterbalance axle and a pivot axle associated with the drawer.

Upon rotating the specified distance (to the initial displaced position of FIG. 3 and in which inner telescoping portion 106' of cylinder 86' is at the position indicated) the angled end tabs 156 and 158 of the counterbalance axle 146 have traveled the full cam follower surfaces of the associated mounting portions 134 and 136 and have abuttingly engaged against the associated end stops (see again at 140 in FIG. 6 for first mounting portion 134). Continued sliding of the drawer 58, against the controlling and biasing forces exerted by the gas spring cylinders, continues along positions 106" and 110" of the inner telescoping portion (see also further position of outer portion at 90") and pivotal end connection of the cylinder 86" (see again FIG. 3).

Referring to FIG. 4, a point is achieved (see furthering position of cylinder 86 in side profile and with outer 90 and inner 106 telescoping portions) and in which a substantially perpendicular arrangement is achieved between the pistons 86 and 88 and the drawer 58. At this point, the weight of the drawer (combined with that of the additional weight of any interiorly held contents) overcomes the forces of the gas spring cylinders and causes the drawer 58 and fixed inner channeling members 126 and 128 to slide relative to the outer channeling members 130 and 132 defining the first and second slide mechanisms. Additional reference is made to downward pivoting arrow 168 and forward translational arrow 170 in FIG. 3 and which additionally references and illustrates the manner in which the drawer assembly sequentially downwardly pivots and forwardly translates according to the present invention.

As previously described, the slow assist forces of the present invention, and which are provided by the gas spring cylinders 86 and 88, assist in maintaining a specified degree of oppositely directed and holding forces to the drawer 58 in both the fully extending and retracted positions, as well as during both extending and retracting motion. Accordingly, and when opening the drawer assembly, a minimum degree of force is required, at a maximum to engage the controlled motion of the assembly.

In a reverse and closing motion, the box is in turn pushed to retract the slide mechanism, following with reverse upward motion causes a substantially equal and reverse action against the pistons, causing the drawer to recess and mate within the corresponding recessed cavity defined in the fixed cover housing. In this position, the gas spring cylinders now apply a reverse pressure to maintain the drawer and slide in the closed position.

Having described my invention, additional preferred embodiments will become apparent to those skilled in the art to which it pertains, and without deviating from the scope of the appended claims. Specifically, the drawer can be designed so that it is removable and reattachable to the cylinder and slide mechanisms. Additionally, and as previously suggested, the present invention can be redesigned for incorporation into other vehicle configurations, notably interiors of vans, other large vehicles and additional structural applications.

Along these lines, the drawer assembly may be configured so that it allows the operator to add storage space for tools or other items to the vehicle and without defacing or changing the original appearance, while also allowing use of the full interior space. Additional variants also contemplate removing the fixed cover housing and securing the drawer assembly directly to a suitable location of the ceiling surface.

I claim:

1. A combination pivotal and slidable drawer assembly mounted in relation to a ceiling surface, said drawer assembly comprising:

a fixed cover housing including generally polygonal shape with a plurality of extending and interconnecting sides defining, in combination, a recessed interior, said cover housing securing against the ceiling surface in order to array said recessed interior in a downwardly facing manner;

a generally polygonal shaped drawer having a base and a plurality of extending and interconnecting sides, said base and sides being dimensioned so as to be matingly received within said recessed interior of said fixed cover housing, said base and sides of said drawer further defining, in combination, an object supportable and open cavity arrayed in opposing fashion to said recessed interior of said cover housing;

a pair of cylinders, first respective ends of said cylinders securing to first and second locations to said fixed cover housing, second respective ends of said cylinders securing to first and second locations of said drawer;

a pair of slide mechanisms, each of said slide mechanisms including an elongated and inner channeling member secured along a respective and parallel extending side of said drawer, said inner channeling members being maintained in translatable and tracking fashion within corresponding elongated and outer channeling members, each of said outer channeling members terminating in a mounting portion projecting beyond said drawer, said mounting portions each including an exterior and arcuately configured cam follower surface terminating in an end stop;

a pivot axle extending between opposite facing sides of said cover housing and engaging said mounting portions to rotatively secure said drawer to said pivot axle;

a counterbalance axle extending between said opposite facing sides of said cover housing in spaced and parallel relation to said pivot axis, a pair of arms projecting from locations of said counterbalance axle, each of said arms terminating in an angle end tab engaged in guiding fashion along an associated cam follow surface; and a release mechanism extending between said matingly received drawer and said cover housing and at a location independent from said pivot axle, said release mechanism being engaged to actuate said cylinders to downwardly pivot said drawer, said counterbalance axle and slide mechanisms successively activating to downwardly and translatably actuate said drawer to a fully extended position in which the object supportable and open cavity is fully exposed.

2. The drawer assembly as described in claim 1, said fixed cover housing and said drawer each further comprising a four sided and substantially rectangular shaped configuration.

3. The drawer assembly as described in claim 2, further comprising a thickened foam insert placeable within at least one of said recessed interior of said fixed cover housing and said object supportable and open cavity of said drawer.

4. The drawer assembly as described in claim 3, further comprising at least one negative impression formed within a thickened foam insert placeable within said drawer, said negative impression corresponding to a configuration of an object placed within said drawer.

5. The drawer assembly as described in claim 1, said cylinders further comprising gas spring cylinders, each having an outer portion pivotally secured to said first and second locations of said fixed cover housing and an inner telescoping portion pivotally secured to said first and second locations of said drawer.

6. The drawer assembly as described in claim 5, further comprising said outer portions of said gas spring cylinders securing to recessed interior locations of said fixed cover housing, said inner telescoping portions securing to locations within said object supportable and open cavity.

7. The drawer assembly as described in claim 1, said counterbalance axle further comprising first and second anchor mounts securing to said opposite facing sides of said cover housing and so that said projecting arms with end tabs are fixed.

8. The drawer assembly as described in claim 1, said release mechanism further comprising a push button located on an outwardly facing surface of a selected side of said drawer opposite a side associated with said pivot axle.

9. The drawer assembly as described in claim 1, said release mechanism further comprising a lock including a first key insertable and rotatable portion associated with an outwardly facing surface of a selected side of said drawer opposite a side associated with said pivot axle, said lock further including a latch located on said cover housing and which is selectively engaged by said key insertable and rotatable portion.

10. The drawer assembly as described in claim 5, further comprising said gas spring cylinders applying a specified degree of opposite and holding force to said drawer in both fully extended and fully retracted positions.

11. The drawer assembly as described in claim 1, said fixed cover housing and said pivotally and translatably associating drawer having a specified shape and configuration and soQ that said cover housing is secured to an underside location of a truck cap.

12. The drawer assembly as described in claim 1, said fixed cover housing and said pivotally and translatably associating drawer having a specified shape and configuration and so that said cover housing is secured to an underside ceiling of an interior room of a standing structure.

13. The drawer assembly as described in claim 1, further comprising a plurality of bolt, spacer and nut fasteners for securing a base surface of said fixed cover housing against the ceiling surface.

14. The drawer assembly as described in claim 1, further comprising a plurality of "L" brackets with channeled pivot pins for securing opposite ends of said cylinders to said fixed cover housing and drawer.

15. The drawer assembly as described in claim 1, further comprising said drawer, upon engagement of said release mechanism, pivoting a selected angular increment not exceeding 90° relative to a horizontal axis extending through said cover housing.

16. The drawer assembly as described in claim 15, further comprising, upon said cylinders pivoting to a substantially perpendicular arrangement relative to said drawer, a force resulting from said counterbalance axle and combined weight of said drawer and supported objects resulting in activating said slide mechanism.

17. A combination pivotal and slidable drawer assembly mounted in relation to a ceiling surface, comprising:

a generally rectangular shaped drawer having a base and extending and interconnecting sides, said base and sides defining an object supportable and open cavity arrayed in opposing fashion to the ceiling surface;

a pair of cylinders, first respective ends of which secure to associated locations of the ceiling surface, second respective ends securing to first and second locations of said drawer;

a pair of slide mechanisms, each of said slide mechanisms including an elongated and inner channeling member secured along a respective and parallel extending side of said drawer, said inner channeling members being maintained in translatable and tracking fashion within corresponding elongated and outer channeling members, each of said outer channeling members terminating in a mounting portion projecting beyond said drawer, said mounting portions each including an exterior and arcuately configured cam follower surface terminating in an end stop;

a pivot axle secured in proximate fashion to the ceiling surface and engaging said mounting portions to rotatively secure said drawer to said pivot axle;

a counterbalance axle extending in spaced and parallel relation to said pivot axis, a pair of arms projecting from locations of said counterbalance axle, each of said arms terminating in an angle end tab engaged in guiding fashion along an associated cam follow surface; and a release mechanism engaged to actuate said cylinders to downwardly pivot said drawer, said counterbalance axle and slide mechanisms successively activating to downwardly and translatably actuate said drawer to a fully extended position in which the object supportable and open cavity is fully exposed.

18. A combination pivotal and slidable drawer assembly mounted in relation to a ceiling surface, said drawer assembly comprising:

a fixed cover housing including a substantially rectangular shape defining, in combination, a recessed interior, said cover housing securing against the ceiling surface in order to array said recessed interior in a downwardly facing manner;

a substantially rectangular shaped drawer having a base and a plurality of extending and interconnecting sides, said base and sides being dimensioned so as to be matingly received within said recessed interior of said fixed cover housing, said base and sides of said drawer further defining, in combination, an object supportable and open cavity arrayed in opposing fashion to said recessed interior of said cover housing;

a pair of gas spring cylinders, outer portions of which pivotally secure, at first respective ends, to first and second locations of said fixed cover housing, inner telescoping portions of said cylinders pivotally securing, at second respective ends, to first and second locations of said drawer;

a pair of slide mechanisms, each of said slide mechanisms including an elongated and inner channeling member secured along a respective and parallel extending side of said drawer, said inner channeling members being maintained in translatable and tracking fashion within corresponding elongated and outer channeling members, each of said outer channeling members terminating in a mounting portion projecting beyond said drawer, said mounting portions each including an exterior and arcuately configured cam follower surface terminating in an end stop;

a pivot axle extending between opposite facing sides of said cover housing and engaging said mounting portions to rotatively secure said drawer to said pivot axle;

a counterbalance axle extending between said opposite facing sides of said cover housing in spaced and parallel relation to said pivot axis, a pair of arms projecting from locations of said counterbalance axle, each of said arms terminating in an angle end tab engaged in guiding fashion along an associated cam follow surface; and a release mechanism extending between said matingly received drawer and said cover housing and at a location independent from said pivot axle, said release mechanism being engaged to actuate said cylinders to downwardly pivot said drawer, said counterbalance axle and slide mechanisms successively activating to downwardly and translatably actuate said drawer to a fully extended position in which the object supportable and open cavity is fully exposed, said gas spring cylinders further providing a specified degree of opposing and holding force to said drawer in both fully extended and fully retracted positions.

* * * * *